United States Patent

[11] 3,588,641

[72] Inventor John H. Fabricius
Stamford, Vt.

[21] Appl. No. 880,530
[22] Filed Nov. 28, 1969
[45] Patented June 28, 1971
[73] Assignee Sprague Electric Company
North Adams, Mass.

[54] ROTARY VARIABLE CAPACITOR
10 Claims, 7 Drawing Figs.

[52] U.S. Cl. ........ 317/249
[51] Int. Cl. ........ H01g 5/08
[50] Field of Search ........ 317/249, 249 (D)

[56] References Cited
UNITED STATES PATENTS
2,913,644 11/1959 Bleazey ........ 317/249

*Primary Examiner*—E. A. Goldberg
*Attorneys*—Connolly and Hutz, Vincent H. Sweeney, Paul O'Sullivan and David R. Thornton

ABSTRACT: A pair of lower electrodes are in capacitive relation to an upper electrode. The upper electrode is coupled to one terminal and a first lower electrode is in connection to another terminal of the unit. The second lower electrode is adapted for connection to this other terminal by a rotary member only during a latter portion of its cycle such that the capacitance associated with the one lower electrode is only presented across the terminals during this portion of the cycle.

ROTARY VARIABLE CAPACITOR

BACKGROUND OF THE INVENTION

This invention relates to a rotary variable capacitor, and more particularly to a rotary variable capacitor having an expanded tuning range.

In rotary capacitors of the prior art, the tuning rate is often limited to approximately 180° of rotation. Hence modification of the prior art structures, in order to alter the tuning curve, usually results in a loss of the overall range.

SUMMARY OF THE INVENTION

An object of this invention is the provision of a rotary variable capacitor having an expanded tuning range.

Another object is the provision of a layered high capacitance variable capacitor which provides capacitance variation over more than a 180° wiper rotation.

Still another object is to provide a variable capacitor having a logarithmic variation in capacitance versus angular rotation.

In accordance with this invention, the rotary variable capacitor comprises a pair of spaced-apart lower electrodes having an overlying upper electrode separated therefrom by a dielectric film. One of the lower electrodes is in direct connection to a first terminal of the unit and the other lower electrode is adapted for selective connection to the one terminal in accordance with position of a rotor member.

In the preferred embodiment two annular segments of conductive material are disposed on a major surface of an insulative substrate and covered with a thin film of dielectric material. A first of these electrode segments extends with gradually increasing width to a coplanar terminal pad of the substrate surface. The second electrode segment is of substantially uniform width and is in connection to a contact area of the upper surface which is spaced from a contact area of the first terminal. An upper electrode, made up of a plurality of isolated conductive areas, is disposed on the dielectric film so as to substantially overlie both electrode segments, and a second terminal is disposed on the film adjacent the upper electrode. A rotor element is pressed into engagement with the upper electrode and the second terminal so as to provide bridging contact therebetween throughout its rotation and interconnection between the segment contact areas only during a portion of its rotation.

In a preferred embodiment ohmic contact is made between an incrementally increasing number of the conductive islands and its adjacent terminal by a rotatable resiliently mounted fine mesh wire gauze which provides, during rotation, a continuous intimate contact between all underlying islands and the adjacent terminal. This arrangement provides a capacitor which, by eliminating the interface gap and by use of high K dielectric films of very few (<10 mils) mils thickness, increases maximum stable capacitance by several orders of magnitude over conventional variable capacitors.

DESCRIPTION OF THE INVENTION

Figure 1:
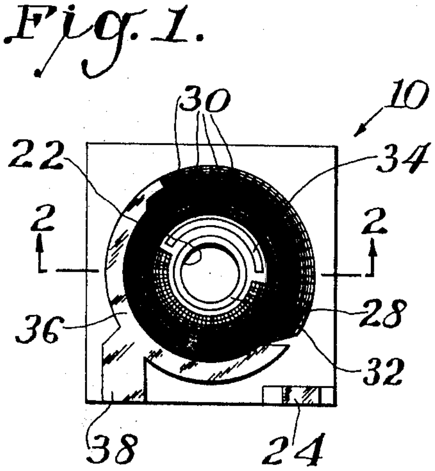
FIG. 1 is a plan view of the stator of the preferred embodiment of the present invention showing the electrode pattern and contact areas of the upper surface.
Figure 2:
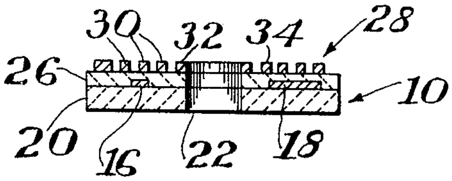
FIG. 2 is a cross-sectional view of the stator taken along line 2–2 of FIG. 1.
Figure 3:
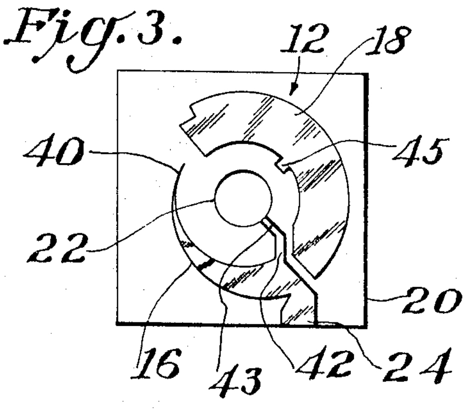
FIG. 3 is a plan view of the stator substrate of FIG. 1 showing the lower electrode pattern.

FIGS. 1, 2 and 3 illustrate a stator member 10 wherein a thin (0.2 mil) film electrode 12 of conductive material such as silver or the like is deposited as two generally semicircular annular segments 16 and 18 on a portion of a major surface of insulating substrate 20. Segments 16 and 18 provide a pair of lower electrodes. Substrate 20, which operates as the support layer of the laminated stator 10, has an aperture 22 therethrough, substantially located at the center of conductive pattern 12. Substrate 20 is of sufficient rigidity and thickness, for example 0.030 inch in the preferred embodiment, to fixedly support the overlying layers. A terminal 24, which is formed with and of the same material as electrodes 16 and 18, extends from its circumference to provide a terminal pad to which a circuit lead can later be soldered.

A layer 26 of a ceramic dielectric is deposited over the surface of film 12 and surrounding portions of substrate 20; the thickness of layer 26 overlying electrodes 16 and 18 being approximately 1 mil. For the present embodiment, aluminum oxide has been used for substrate 20 and a barium titanate glass mixture having a dielectric constant of approximately 400 for dielectric layer 26. For example, the barium titanate mixture as described in U.S. Pat. application No. 767,046 filed by Galeb A. Maher on Sept. 26, 1968 is suitable. A thin film (0.7 mil thick) of conductive material such as silver or the like, is then deposited over the outer surface of layer 26 to provide an electrode pattern 28, having isolated islands 30, and appropriate contact areas. These include spaced contacts 32 and 34 (which are centered within electrode 28), and a terminal made up of contact area 36 and input terminal 38. Pattern 28 is disposed over and cooperates with the underlying continuous electrodes 16 and 18 to form a capacitance.

Various methods of deposition for formation of the continuous and discontinuous or island electrodes and contact areas etc. can be used, such as spraying, sputtering, dipping, vacuum deposition and silk screening. Of course, the isolated electrode areas can be formed during film deposition or may be formed from a completed continuous film by photolithographic etching techniques or the like. Some of the appropriate materials for these conductive films are tantalum, gold, silver, platinum, rhodium, iridium, copper, molybdenum, or combinations thereof.

Stator 10 is designed such that when a rotor element (later described in detail) is urged into contact with its surface, selective bridging connection between some of the islands 30 and the adjacent termination 38 is provided throughout its rotation, and interconnection between contacts 32 and 34 (which are always isolated from termination 38) is provided only during a later portion of the rotary cycle. This provides a capacitance between terminals 24, 38 which first varies in accordance with the contacted islands overlying electrode segment 16 and then additionally varies in accordance with the contacted islands overlying electrode segment 18; once connection between contacts 32 and 34 is made. After contact 34 is joined electrically to contact 32 by rotor 50, capacitance is varied by incrementally adding segment 18 while subtracting segment 16.

Figure 4:
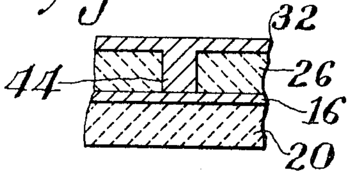
FIG. 4 is an enlarged view in cross section of one of the vertical conductive paths provided in the stator of FIG. 1.

As shown in FIG. 3, both electrodes 16 and 18 are arcuately curved, annular segments. Electrode 16 increases in width from one end 40 to the other end 42 where it is joined to termination 24. It is also connected at 43, near end 42, to upper contact ring 32 by a vertical conductive path 44 as shown in FIG. 4. On the other hand, electrode 18 is connected at point 45, near the center of this segments inner perimeter by a similar vertical conductor to contact segment 34. In construction of the unit, holes are provided in film 26 at points 43 and 45 during its formation, and the vertical conductors are then formed during formation of the upper conductive layer.

Figure 6:
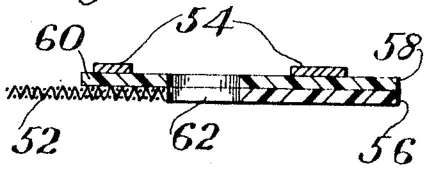
FIG. 6 is an enlarged fragmentary view in cross section of the rotor taken along line 6–6 of FIG. 5.
Figure 5:
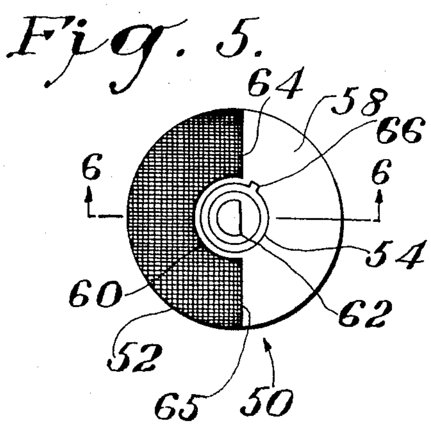
FIG. 5 is a plan view of the rotor utilized in the preferred embodiment.

FIGS. 5 and 6 illustrate rotor member 50 which includes a first conductive surface portion or wiper 52, designed for island to terminal interconnection, and a second conductive surface or slip ring 54 (which is isolated from wiper 52) designed for selective interconnection of contacts 32 and 34.

Preferably, rotor 50 is a laminated structure made up of a strip of conductive material 52 such as a fine wire mesh of stainless steel, or bronze, or the like, which is butted against a thin (approximately 1½mil thick) insulative film 56 of plastic such as Mylar or the like. A thin (approximately 1 mil thick) film 58 of low friction material such as Teflon or the like provides a skid plate which is bonded or cemented by conventional means to lower film 56 and in slightly overlying arrangement (for example a 40 mil overlap) to mesh 52. Additionally, a semicircular segment 60 of film 58 is extended further over mesh 52 for insulation of ring 54 therefrom. The strip assemblies are then punched or cut in a circular arrangement centered on portion 60 with a substantially centrally located D-shaped aperture 62. The flat of aperture 62 is aligned in substantially parallel arrangement to the leading edge 64 and trailing edge 65 of mesh 52. A thin, for example, a 2 mil thick, ring 54 of conductive material such as phosphorous bronze or the like having a radially extended arm 66 is then centrally located around aperture 62 and joined to layer 58 by cementing or the like with its arm 66 positioned at a leading angle (for example approximately 50°) to leading edge 64. Ring 54 is of approximately the same size and width as contact ring 32 and its arm 66 is sufficiently long to bridge the gap between contact 32 to contact 34 for their interconnection.

Figure 7:
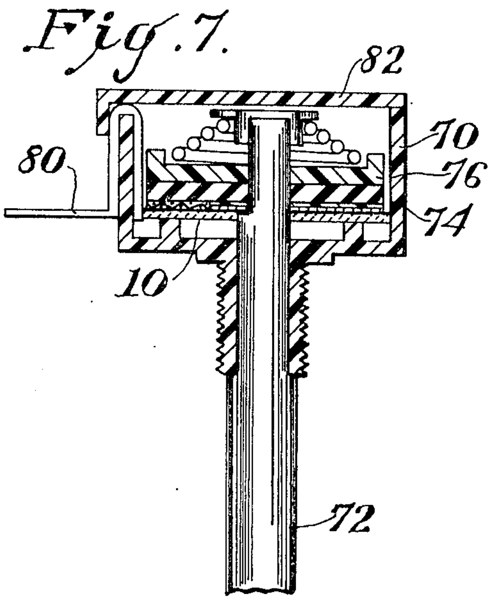
FIG. 7 shows the assembled capacitor provided in accordance with a preferred embodiment of the present invention.

An assembled unit is shown in FIG. 7 wherein stator 10 is disposed within an insulating housing 70. A shaft 72 extends within housing 70 and through stator 10. Rotor 50 is keyed to a flattened portion of shaft 72 and is urged into contact with electrode 28 and contacts 32, 34 by a resilient cushion 74 of rubber or the like which is pressed against rotor 50 by pressure plate or cup 76 and spring 78. Spring 78 is compressed between the end of shaft 72 and cup 76 so as to force rotor 50 into engagement with stator 10.

A terminal-lead 80 which extends from housing 10 is provided in connection with upper terminal pad 38 of stator 10. A similar terminal-lead (not shown) is provided in connection to lower terminal pad 24, and a cover 82 is disposed on the open end of housing 70 and joined to it to complete the assembly.

Assuming a signal is present at terminals 24 and 38 to which a specified capacitance value is to be presented, and further assuming for purposes of the example that a counterclockwise rotation of rotor 50 is utilized (looking down on rotor towards the stator), as wiper 52 begins to slide over the abutting face of stator 10 it interconnects discontinuous electrode 28 to contact portion 36 (and terminal 38). As indicated, each island area 30 acts with the opposing electrodes 16 and 18 (and dielectric 26 therebetween) to provide capacitance. Hence, as leading edge 64 of wiper 52 rotates over stator 10, each island 30 is incrementally and electrically connected in parallel with precedingly contacted islands and with contact area 36 to provide a capacitance at terminals 24, 38 in accordance with both the portion of lower electrode underlying the contacted islands and with lower electrode connection to terminal 24. The rows of island areas forming pattern 28 are generally located obliquely to the leading edge 64 of wiper 52, or that is, offset from the center of the annular segment so as to allow wiper 52 to contact an incrementally increasing number of islands 30 during rotation so as to assure the smoothest capacitance change.

As can be seen from FIGS. 1 and 3, contact 34 is an annular segment, approximately semicircular and of smaller diameter than electrode 18. Contact 34 is positioned on the surface of film 26 so as to lie within the inner diameter of segment 18 and is angularly oriented with it such that arm 66 provides interconnection between contacts 32 and 34, or that is interconnection between electrode 18 and terminal 24 only while the leading edge 64 of wiper 52 is over segment 18. For smooth tuning, contact 34 is positioned such that interconnection is made as soon as the trailing edge 65 of wiper 52 moves off islands overlying electrode 18, and just prior to leading edge 64 cooperating with electrode 18. As rotation continues, the interconnection is again opened just prior to the cooperation of leading edge 64 with electrode 16.

Consequently, during counterclockwise rotation of wiper 50, as leading edge 64 begins initially contacting islands arranged over the free end 40 of electrode 16, arm 66 is not yet in connection to contact 34 so that the capacitance across terminals 24, 38 is due only to contacted islands overlying segment 16. This follows, since although islands overlying electrode 18 are also in contact with portions of wiper 52 at this time, no capacitance thereof is presented at terminal 38 since it is disconnected from electrode 18.

As the counterclockwise rotation is continued the capacitance gradually increases in proportion to the increasing area of electrode 16 until leading edge 64 begins to contact islands overlying electrode 18. At this point (approximately 180° from start) contact 32 is interconnected to contact 34 (by ring arm 66) and the capacitance associated with electrode 18 begins to additively appear at terminals 24 and 38. Continued rotation provides a gradual increase in contact to islands overlying electrode 18 and at the same time a simultaneous decrease in contact of islands overlying electrode 16 since wiper 52 is approximately a semicircle. Hence, as the capacitance associated with segment 18 is increasingly added to the circuit, the capacitance of segment 16 is increasingly subtracted. Consequently, in order to produce a smooth regular tuning curve, segment 18 is substantially uniform in width.

In a specific example, a thin (approximately 0.2 mil) layer of silver was screened on an aluminum oxide substrate to provide lower electrodes 16, 18 and termination 24 as shown in FIG. 3. Electrode 16 was formed with a length of approximately 170° of arc and an inner radius of approximately seven thirty-seconds inch. This electrode was tapered smoothly from a point at end 42 to a width of approximately thirteen sixty-fourths inch at termination 24 so as to provide an electrode width which increased substantially logarithmically with angular displacement. The outer edge diverges from the inner radius so as to provide this gradually increasing width.

Electrode 18, which was also approximately 170° of arc, was formed with an eleven sixty-fourths inch inner radius approximately and is nine sixty-fourths inch wide except for the end portions. In this regard, the end adjacent terminal 24, is initially thirteen sixty-fourths inch wide approximately and tapers within approximately one sixteenth inch to the full width. The other end of electrode 18 is indented at the outer edge of accommodate the overlap of contact area 36. In the specific example, the indent was approximately seven sixty-fourths inch long and one-eighth inch wide.

A thin dielectric film of barium titanate glass mixture having a dielectric constant of approximately 250 was then deposited over electrodes 16 and 18, and a silver layer (approximately 0.7 mils thick) was screened over the dielectric film in the general pattern illustrated in FIG. 1. In this case, contact 34 was made in a ring shape approximately one sixty-fourth inch wide, with an inner radius of approximately seven sixty-fourths inch, and contact 36 was formed with an inner radius of five thirty-seconds inch and a width of one sixty-fourth inch approximately.

Contact area 36 was made approximately one-sixteenth inch wide with an inner radius of approximately five-sixtenth of an inch. The electrode pattern 30 was formed to conform to an of approximately three-eighths inch with clearance around contacts 32 and 34 of approximately 0.005 inch. Electrode 30 was formed as a plurality of substantially rectangular islands, approximately 0.008 inch on a side with approximately 0.002 inch clearance between each other and contact area 36.

Rotor 50 was made up with approximately an 180° arc length of stainless steel 250 square weave mesh wiper having an inner and outer radius of approximately eleven sixty-fourths of an inch and three-eighths inch respectively. A skid plate of Teflon was employed with a 0.002 inch thick contact ring 54 of phosphorous bronze. The ring was 0.025 inch wide with an inner radius of 0.1000 inch, and included an 0.075 inch wide tab projecting 0.045 inch approximately from the outer perimeter.

The assembled unit of this example, provided a substantially smooth tuning curve in which the angle of displacement closely approximated a constant times the logarithm of capacitance, and the capacitance varied smoothly from 10 to 10,000 pf.

For maximum stability, it is preferable that complete annular rings be engaged. It is also preferable that no portion of rotor wiper 52 be allowed to contact the surface of dielectric 26 since this would permit unwanted variation in capacitance. Hence, island electrode 28 and contact segment 36 make up a substantially complete annulus while rotor wiper 52 with skid plate 58 make up a mating annulus of approximately the same diameter.

Although the island pattern of the preferred embodiment comprises sectored segments, the invention is not limited to such a pattern. Hence island segments may be rectangular, round, oval, etc. Moreover, the pattern need not be uniform throughout. For example, the surface available for pattern 30 may be divided into sectors or zones (not shown), each of which has a different row orientation and/or islands of differing geometry. This arrangement affords a capacitance variation at different incremental rates depending upon the sector over which wiper 52 is advancing.

Other embodiments of this invention consistent with the above described features may also be practiced. For example, the available capacitance may be increased by making use of both sides of stator 10. That is, the cross-sectional structure shown in FIG. 2 may be modified by depositing another pair of continuous electrode segments on the opposing surface of substrate 20. Thereafter, forming a second dielectric layer with vertical conductors from the electrode segments. Finally, another conductive film is formed on the outer dielectric surface in an island pattern along with contact areas similar to that formed on the upper surface. Assuming the same materials, surface areas and pattern geometry etc. of the first stator capacitor as described above, a second wiper identical to that previously described in FIGS. 5 and 6 will result in substantially the same capacitance as its opposite member as it advances across islandic pattern 42 in synchronism with the first wiper. If the capacitance of both capacitors are are connected in parallel, the total available capacitance will thereby be doubled.

The two wipers can also be rotated in opposite directions or out of phase with each other, for example, the upper wiper may be mounted on shaft 72 so that it is keyed 180° from the lower wiper. In this case, and assuming each internal electrode is connected to a different potential and both terminals of the island electrodes are commonly connected, the capacitor pair acts as a capacitance voltage divider. A signal potential can then be developed intermediate that on either internal electrode.

In the preferred embodiment, substrate 20 is a ceramic support member which carries a conductive electrode surface or the like, however, other arrangements are possible. For example, lower electrode 12 and dielectric film 26 may be provided by a thin tantalum sheet having an oxidized upper surface, or by reduced barium titanate having a thin oxidized surface.

In appropriate cases, the substrate itself may be of conductive or semiconductive material such as tantalum or reduced barium titanate. Of course, if the substrate body is to be of conductive material, the upper contact areas and terminal 38 must be substantially isolated from the substrate by low dielectric constant material or the like in order to avoid their contribution of capacitance in this case.

I claim:

1. A variable capacitor comprising a pair of spaced apart lower electrodes, said lower electrodes being annular segments arranged in a circular configuration, a first terminal connected to a first of said lower electrodes, an upper electrode disposed in capacitive relation to said lower electrodes with an intervening layer of dielectric material, a second terminal coupled to said upper electrode, a rotary means adapted to vary the capacitance between said terminals, and said rotary means adapted to connect said first terminal to the second of said lower electrodes during a selected portion of its cycle such that the capacitance associated with said second electrode is presented on said terminals only during said selected portion of said cycle.

2. The capacitor of claim 1 wherein said selected portion of said cycle is the latter portion thereof.

3. The capacitor of claim 1 wherein said upper electrode comprises a plurality of isolated island segments, said second terminal is located adjacent said upper electrode, said rotary means includes a first conductive surface portion urged into contact with said second terminal and selected island areas of said upper electrode for providing said capacitive variation, and said rotary means includes a second conductive surface portion isolated from said first surface portion and adapted for coupling said first terminal to said second lower electrode.

4. The capacitor of claim 3 wherein a pair of spaced contacts are located adjacent said upper electrode, said first terminal being in connection with a first of said pair of contacts, said second lower electrode being in connection with the second of said spaced contacts, and said second conductive portion of said rotary means being urged into connection with one of said contacts and adapted to provide bridging connection to the other of said contacts throughout selected degrees of angular rotation of said rotary means such that the capacitance associated with said second lower electrode is additively presented to said terminals only during said selected degrees of rotation.

5. The capacitor of claim 4 wherein said electrodes and said thin film are provided in a layered arrangement on an insulating substrate, and wherein said lower electrodes are spaced thin conductive layers forming a surface portion of said substrate, said dielectric film is thin layer overlying said lower electrodes, and said upper electrode is a thin conductive layer disposed in an island pattern in overlying relation to said lower electrodes.

6. The capacitance of claim 5 wherein said first terminal is a conductive layer portion of said substrate and is in connection to one end of said first electrode, said first electrode decreasing in width from the other end to said one end, said upper electrode includes isolated islands deposited in a substantially annular arrangement overlying both said first and second electrodes, said contact pair are thin conductive layers located on said dielectric surface adjacent said upper electrode, a first conductive path extends from said first electrode to said first contact, and a second conductive path extends from said second electrode to said second contact.

7. The capacitor of claim 5 wherein said first conductive portion of said rotary means is an annular segment, and said second conductive portion is an annular ring located within the center of said first conductive portion and isolated therefrom, said ring having a radially extended tab, said first conductive portion being urged into engagement with said upper electrode, said ring being urged into engagement with said first contact, and said tab adapted to contact said second contact during rotation of said rotor for interconnection of said second electrode with said first terminal.

8. The capacitor of claim 7 wherein said first contact is an annular ring substantially centrally spaced within the inner diameter of said upper electrode, and said second contact is an annular segment closely spaced outside of said first contact.

9. The capacitor of claim 7 wherein said second terminal is a layer of conductive material deposited on said dielectric surface adjacent the outer perimeter of said second electrode, and said second terminal includes an arcuately curved portion substantially conforming to said outer perimeter.

10. The capacitance of claim 9 wherein: said first conductive portion is a wiper formed as a substantially semicircular annular segment; said ring tab is positioned to lead the leading edge of said wiper by a few degrees; said arcuately curved portion of said second terminal slightly exceeds 180° and is centrally located around the area of said upper electrode which overlies said first electrode; and said second contact of said contact pair is approximately 180° in length and is centrally located within the area of said upper electrode which overlies said second electrode such that as said leading edge of said wiper is rotated over said first electrode, said second electrode is in open connection with said first terminal, and as said leading edge is rotated over said second electrode, said second electrode is in connection to said first terminal such that during rotation the capacitance between said terminals initially increases in accordance with bridging contact to the islands overlying only said first electrode segment and after approximately 180° rotation increases in accordance with bridging contact to the islands overlying both said first and second electrodes.

UNITED STATES PATENT OFFICE

CERTIFICATE OF CORRECTION

Patent No. 3,588,641 Dated June 28, 1971

Inventor(s) John H. Fabricius

It is certified that error appears in the above-identified patent and that said Letters Patent are hereby corrected as shown below:

Column 4, line 45, "of" (first occurrence) should read -- to --
Column 4, line 59, "sixtenth" should read -- sixteenth --
Column 4, line 61, after "an" insert -- outer radius --
Column 5, line 40, delete "are" (first occurrence)

Signed and sealed this 30th day of November 1971.

(SEAL)
Attest:

EDWARD M.FLETCHER,JR.
Attesting Officer

ROBERT GOTTSCHALK
Acting Commissioner of Patents

FORM PO-1050 (10-69)

USCOMM-DC 60376-P69
☆ U.S. GOVERNMENT PRINTING OFFICE : 1969 O—366-334